(12) United States Patent
Coffield

(10) Patent No.: US 7,618,572 B2
(45) Date of Patent: Nov. 17, 2009

(54) METHOD AND APPARATUS FOR MANUFACTURING LOAD BEARING FABRIC SUPPORT STRUCTURES

(75) Inventor: Timothy P. Coffield, Grand Rapids, MI (US)

(73) Assignee: Illinois Tool Works Inc., Glenview, IL (US)

( * ) Notice: Subject to any disclaimer, the term of this patent is extended or adjusted under 35 U.S.C. 154(b) by 527 days.

(21) Appl. No.: 11/432,254

(22) Filed: May 11, 2006

(65) Prior Publication Data
US 2007/0035064 A1    Feb. 15, 2007

Related U.S. Application Data

(60) Provisional application No. 60/707,879, filed on Aug. 12, 2005.

(51) Int. Cl.
| B29C 45/14 | (2006.01) |
| B29C 70/44 | (2006.01) |
| B29C 49/08 | (2006.01) |
| B29C 55/00 | (2006.01) |
| B27N 3/10  | (2006.01) |
| B28B 11/08 | (2006.01) |
| B29C 67/00 | (2006.01) |
| B32B 23/02 | (2006.01) |
| A47C 7/02  | (2006.01) |

(52) U.S. Cl. .............. 264/229; 264/257; 264/275; 264/291; 264/DIG. 73; 425/383; 428/192; 297/452.56

(58) Field of Classification Search .......... 264/257, 264/229, 252, 271.1
See application file for complete search history.

(56) References Cited

U.S. PATENT DOCUMENTS

| 4,743,323 | A  |   | 5/1988 | Hettinga |
| 5,676,894 | A  | * | 10/1997 | Specht .................. 264/46.4 |
| 6,444,152 | B1 | * | 9/2002 | Salas et al. ............... 264/163 |
| 2002/0043845 | A1 |   | 4/2002 | VanDeRiet et al. |
| 2005/0064149 | A1 |   | 3/2005 | Iseki et al. |

FOREIGN PATENT DOCUMENTS

| JP | 04085013 | 3/1992 |
| JP | 2002085185 | 3/2002 |
| WO | WO 2004/078002 | 9/2004 |
| WO | WO 2005 046952 | 5/2005 |

* cited by examiner

Primary Examiner—Christina Johnson
Assistant Examiner—Benjamin Schiffman
(74) Attorney, Agent, or Firm—Mark W. Croll; Paul F. Donovan

(57) ABSTRACT

A method and apparatus for manufacturing load bearing fabric structures in which the peripheral edge of the load bearing fabric terminates with the mold cavity. The apparatus includes a stretching assembly for stretching the fabric, a fabric retaining assembly for holding the fabric in the stretched condition and a mold assembly for molding the frame about the periphery of the fabric. The method includes the steps of gripping the peripheral edge of the fabric in a stretching assembly, activating the stretching assembly to stretch the fabric in a location adjacent to the mold assembly, clamping the stretched fabric against a face of the mold assembly, releasing the peripheral edge of the fabric from the stretching assembly, moving the stretching assembly from the path of the mold assembly, closing the mold assembly on the fabric with the peripheral edge of the fabric terminating in the mold cavity and injecting molten material into the mold cavity to form the frame directly on the peripheral edge of the fabric.

15 Claims, 6 Drawing Sheets

METHOD AND APPARATUS FOR MANUFACTURING LOAD BEARING FABRIC SUPPORT STRUCTURES

This application claims the benefit of U.S. Provisional Patent Application No. 60/707,879 filed on Aug. 12, 2005.

BACKGROUND OF THE INVENTION

The present invention relates to support structures and more particularly to methods and apparatus relating to support structures incorporating load bearing fabric as a load bearing surface.

Load bearing fabric continues to gain an increasing share of the market for load bearing surfaces. Load bearing fabrics have a variety of desirable characteristics. For example, load bearing fabrics provide a durable, high strength load bearing surface that is attractive and easily maintained. The characteristics of load bearing fabrics can be tuned to provide, among other things, a surface that is well-suited for use in seating and other body support applications.

Experience has revealed that it can be difficult to manufacture load bearing fabric structures by directly molding the fabric to support structure. Typically, the type of materials required to withstand the loads applied to the load bearing structure are not well-suited for direct molding with the load bearing fabric. For example, the mold conditions required to mold the frame material could damage the load bearing fabric. To address this problem, the load bearing fabric in many applications is mounted to a support frame using a "carrier." The carrier is an intermediate component that is manufactured from a material that is more suitable for direct molding with the load bearing fabric. Accordingly, the carrier may be molded in place on the fabric to provide a structure that can be mounted to the support frame. The use of a separate carrier increases the manufacturing and assembly cost of the structure. For example, the use of a separate carrier requires an additional mold and, during manufacture requires time and effort to manufacture the carrier and attach it to the frame.

As technology relating to load bearing fabrics and associated structural counterparts continued to improve, it become possible to more consistently and uniformly mold the frame in place directly on the fabric. In conventional manufacturing systems of this type, the fabric extends fully through the mold cavity and its peripheral edge is held outside the mold cavity, for example, by the mold itself or by a stretching assembly located outside mold. Although these manufacturing systems overcome some of the problems associated with the use of a separate carrier, the excess fabric used to hold the fabric must be trimmed from the load bearing structure. This results in waste fabric and can leave a visible trim line around the load bearing structure.

Accordingly, there remains a need for an improved apparatus and method for manufacturing a load bearing fabric structure in which the frame is molded in place directly onto the fabric.

SUMMARY OF THE INVENTION

The aforementioned problems are overcome by the present invention which provides an apparatus for manufacturing load bearing fabric structures in which the load bearing fabric is connected directly to a support frame. The apparatus generally includes a mold for forming the support frame, a stretching assembly for stretching the load bearing fabric and a fabric retaining assembly disposed inwardly of the mold for holding the fabric in the stretched condition during molding.

In one embodiment, the mold includes two mold parts and the stretching assembly is mounted adjacent to the mold to stretch the fabric in the space between the mold parts. In one embodiment, the stretching assembly includes one or more movable clamps that close on the edge of the fabric and are then movable to exert a stretch on the fabric.

In one embodiment, the fabric retaining assembly includes a fabric head that retains the fabric in a stretched condition during molding. In one embodiment, the fabric head cooperates with a mold part to sandwich the stretched load bearing fabric and thereby hold it in the stretched condition. In another embodiment, the fabric head may include a plurality of pins that pass through the interstices of the load bearing fabric to hold the fabric in the stretched condition.

In one embodiment, the mold includes a stationary mold part and a moving mold part. In this embodiment, the stretching assembly is mounted adjacent the stationary mold part where it stretches the load bearing fabric adjacent to the surface of the stationary mold part. In this embodiment, the moving mold part may be generally peripheral and define an internal void containing the head of the fabric retaining assembly, thereby permitting the moving mold part to close on the stretched fabric while it is being held by the fabric retaining assembly.

The present invention provides a method for manufacturing a load bearing support structure including the general steps of: (1) stretching a load bearing fabric with a stretching assembly, (2) holding the load bearing fabric in the stretched condition with a fabric retaining assembly, (3) releasing the fabric from the stretching assembly to provide a free edge while continuing to hold at least a portion of the fabric in the stretched condition with the fabric retaining assembly, (4) closing a mold about the fabric with at least a portion of the free edge of the fabric contained in the mold cavity, (5) injecting support frame material into the mold cavity, and (6) allowing the support frame material to cure and thereby become integrally bonded with the load bearing fabric. The size and shape of the load bearing fabric are selected so that at least a portion of the load bearing fabric terminates within the mold cavity after it is released by the stretching assembly.

The present invention provides an efficient, effective and relatively inexpensive apparatus for manufacturing load bearing fabric structures in which the frame is molded in place about the load bearing fabric. The fabric retaining assembly permits the peripheral edge of the load bearing fabric to terminate in the mold cavity, thereby eliminating the need to trim the fabric. The stretching assembly provides consistent, controlled fabric stretch. The fabric retaining assembly retains a desired portion of the fabric in the stretched condition during the molding operation., thereby allowing the stretching assembly to be moved out of the way during molding so that it does not interfere with mold operation. As a result, the present invention provides a uniform, repeatable manufacturing process having an efficient cycle time.

These and other objects, advantages, and features of the invention will be readily understood and appreciated by reference to the detailed description of the current embodiment and the drawings.

DESCRIPTION OF THE CURRENT EMBODIMENT

Figure 1:
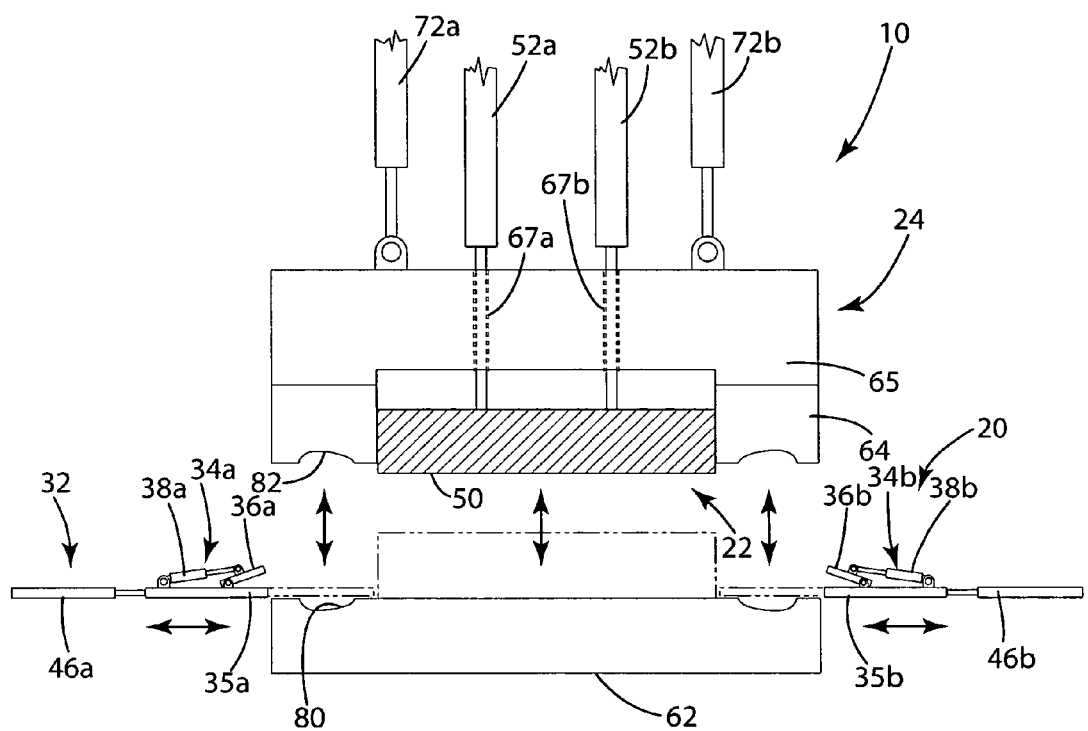
FIG. 1 is a partially sectional side view showing a manufacturing system in accordance with an embodiment of the present invention.

A system for manufacturing a load bearing fabric structure is shown in FIG. 1 and generally designated 10. The manufacturing system 10 is configured to mold a structural frame 12 directly onto the periphery of a section of pre-stretched load bearing fabric 14. The system 10 generally includes a stretching assembly 20 for stretching the load bearing fabric 14, a fabric retaining assembly 22 for holding the fabric 14 in the stretch condition after the fabric 14 has been released by the stretching assembly 20 and a mold assembly 24 for molding the frame 12 about the fabric 14 while the fabric 14 is being held by the retaining assembly 22. The present invention is described in connection with a manufacturing system 10 that is well-suited for use in the manufacture of load bearing fabric seat assemblies and back assemblies for seating applications. The present invention is, however, well-suited and may be readily implemented in manufacturing systems for other types of load bearing fabric structures.

For purposes of disclosure, the present invention is described in connection with a relatively simple vertical press mold. The present invention is also well-suited for use in horizontal press molds and molds of other configurations.

The term "load bearing fabric" is used in this application to refer to elastomeric fabrics that have sufficient strength to form a surface capable of supporting a load. Although the term "load bearing fabric" is used to refer to essentially any woven or non-woven elastomeric fabric, the elastomeric fabric may include elastomeric monofilaments woven together with multifilament yarns or other fill yarns. The elastomeric monofilaments may be manufactured from a thermoplastic elastomer block copolymer. One suitable material of this type is available from DuPont under the Hytrel® trademark. The present invention is not, however, limited to any particular elastomeric material and, to the contrary, may include essentially any elastomeric strands or filaments (monofilament or multifilament). As an alternative to the use of fill yarn, the fabric may include elastomeric filaments extending in both directions. If desired, the warps and wefts of the elastomeric fabric may be welded together at their intersections. The precise construction of the load bearing fabric may vary from application to application depending in part on the anticipated load and desired support characteristics.

1. Stretching Assembly.

Figure 2:
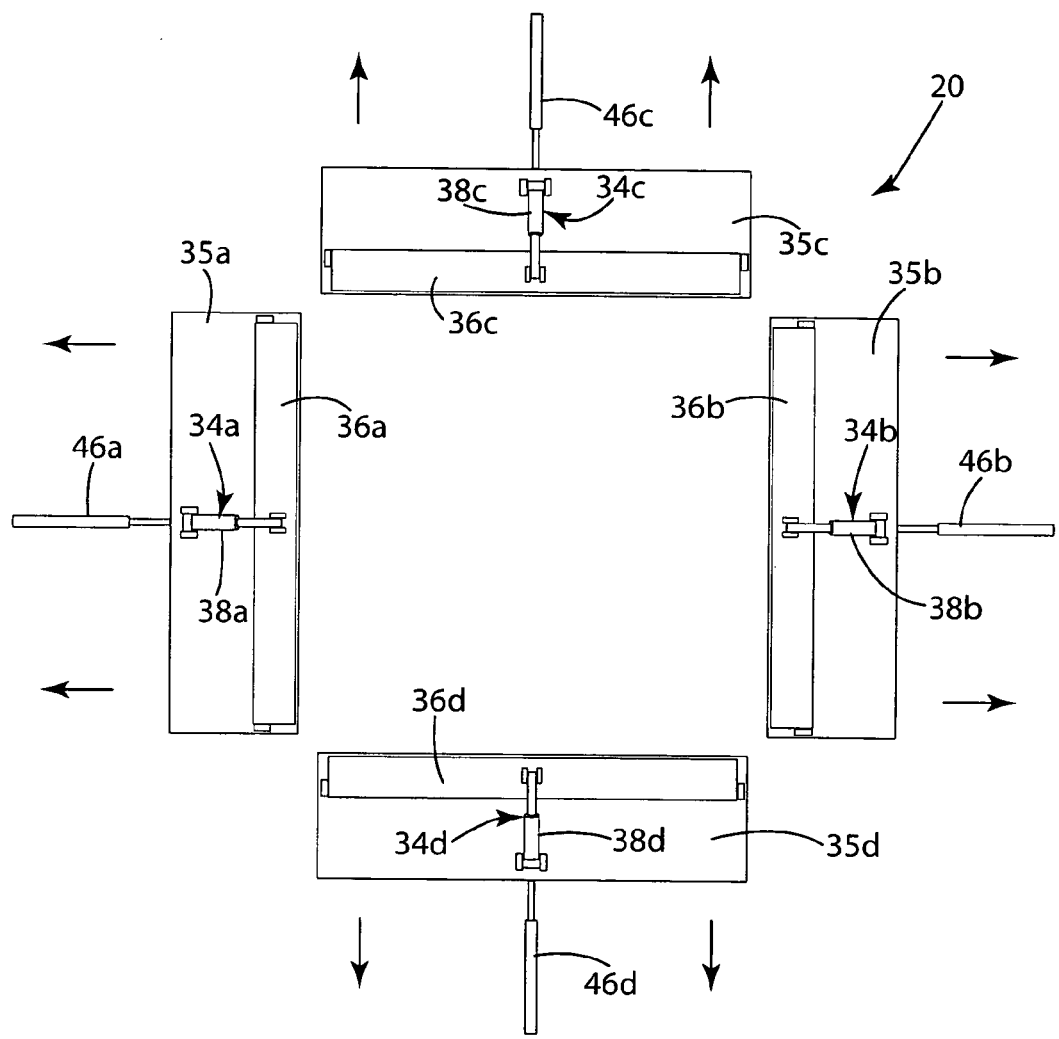
FIG. 2 is a top view of the stretching assembly.
Figure 3:
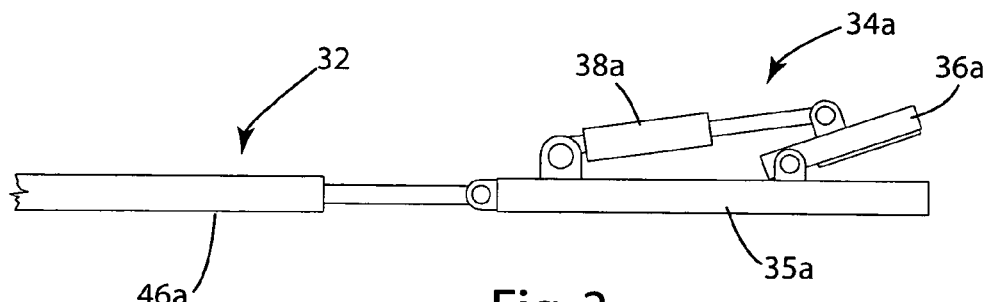
FIG. 3 is a side view of a clamp assembly.

As noted above, the manufacturing system 10 includes a stretching assembly 20 for stretching the load bearing fabric 14. The stretching assembly 20 generally includes a clamp assembly 30 that is carried by an expansion assembly 32. The clamp assembly 32 is configured to grip the peripheral edge of the fabric 14 and, in the illustrated embodiment, includes four clamps 34a-d that are operable to selectively close on the fabric 14 (See FIG. 2). The design and configuration of the clamps 34a-d may vary from application to application; however, in the illustrated embodiment, each clamp 34a-d includes a base 35a-d, a clamp head 36a-d and a clamp cylinder 38a-d (See FIG. 3). The clamp head 36a-d is pivotally mounted to the corresponding base 35a-d. The clamp cylinder 38a-d is mounted between the base 35a-d and the clamp head 36a-d. For example, the cylinder body may be mounted to the base 35a-d and the rod may be mounted to the clamp head 36a-d. This configuration allows the clamp heads 36a-d to be selectively opened and closed through selective extension and retraction of the clamp cylinders 38a-d.

Although the stretching assembly 20 of the illustrated embodiment includes clamps 34a-d for gripping the edge of the fabric 14, the clamps 34a-d may replaced by other mechanisms capable of retaining the peripheral edge of the fabric during the stretching process. For example, pins, hooks or other similar structures may be used in place of clamps in some application. These alternative mechanism may be more suitable for use with welded load bearing fabrics because the welds will help to prevent the fabric from being damaged under the force of the stretching operation.

The expansion assembly 32 is configured to move the clamps 34a-d inwardly and outwardly with respect to the mold assembly 24 to selectively apply stretch to the fabric 14. The design and configuration of the expansion assembly may vary from application to application; however, in the illustrated embodiment, the expansion assembly 32 includes a plurality of stretch cylinders 46a-d that operatively connect the base 35a-d of each clamp 34a-d to a support structure (not shown). As a result, extension and retraction of the stretch cylinders 46a-d results in movement of the clamps 34a-d with respect to the support structure 40. This movement in turn results in stretching of the fabric 14. If desired, the base 35a-d of each clamp 34a-d may be slidably mounted within rails (not shown) or other similar structure capable of supporting and/or shepherding movement of the base 35a-d.

In the illustrated embodiment, the stretching assembly 20 includes four clamps 34a-d and four stretch cylinders 46a-d that cooperate to simultaneously stretch the fabric 14 from four sides. The stretching assembly 20 may alternatively be configured to stretch the fabric from a greater or smaller number of sides. For example, if stretching is desired in only one direction, the stretching assembly 20 may includes only two clamps that are positioned opposite one another across the fabric to simultaneously pull the fabric in opposite directions. In some applications, it may be possible to apply the desired stretch with only one moving clamp. Further, in the illustrated embodiment, the stretching assembly 20 includes a single slide and clamp assembly along each side of the fabric. If desired, a plurality of slides and clamp assemblies may be positioned along a single side of the fabric to allow variations in the amount of stretch along that side of the fabric (not shown).

2. Fabric Retaining Assembly.

Figure 4:
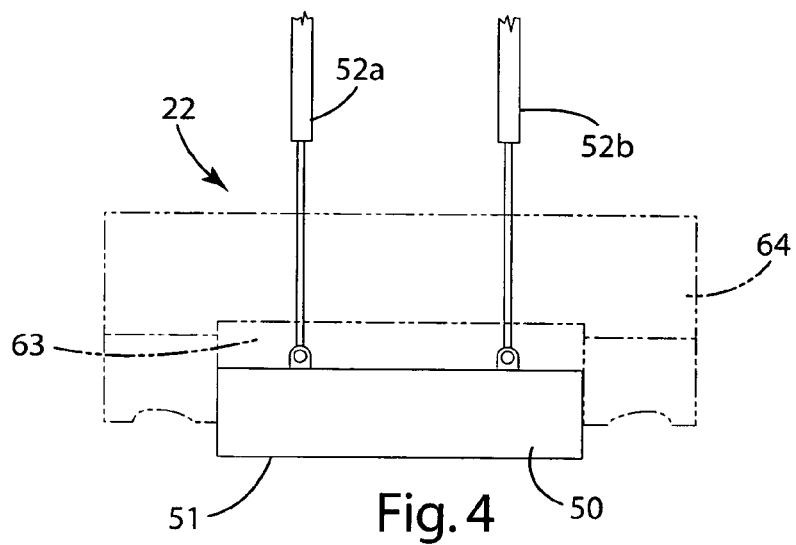
FIG. 4 is a side view of the fabric retaining assembly showing the moving mold part in phantom lines.

The fabric retaining assembly 22 is configured to selectively hold at least a portion of the stretched fabric 14 in the stretched condition during the molding process. Referring now to FIG. 4, the fabric retaining assembly 22 includes a head 50 and a pair of retaining cylinders 52a-b. The head 50 is mounted within a void 63 in the moving mold part 64 such that it does not interfere with movement of the mold assembly 24. The head 50 is dimensioned to fit inwardly from the clamps 34a-d when the stretching assembly 20 is in the stretched position so that the head 50 does not interfere with operation of the clamps 34a-d. The head 50 includes a fabric surface 51 intended to directly engage the fabric 14 during operation. In the illustrated embodiment, the fabric surface 51 that engages the fabric 14 throughout the entire region of the fabric 14 that is to be held in the stretched condition by the fabric retaining assembly 22. Alternatively, the head may be configured to engage only select portions of the fabric 14. For example, the fabric surface 51 may be essentially ring-shaped to retain a circular portion of the fabric 14 in the stretched condition (not shown).

The head 50 is extendible and retractable by operation of the retaining cylinders 52a-b. When extended, the head 50 clamps the fabric 14 against the face of the stationary mold part 62 (described in more detail below). The retaining cylinders 52a-b interconnect the head 50 and an external support structure (not shown). For example, the cylinder body of each retaining cylinder 52a-b may be mounted to the support structure and the rod of each retaining cylinder 52a-b may be mounted to the head 50. In the illustrated embodiment, the retaining cylinders 52a-b extend freely through openings in the mold backing plate 65. The retaining cylinders 52a-b may be replaced by other mechanisms capable of moving the head 50 into and out of engagement with the fabric 14.

In the illustrated embodiment, the fabric retaining assembly 22 operates by clamping the fabric 14 against the face of the stationary mold part 62. The retaining assembly 22 may alternative clamp the fabric against other structures (not shown), such as a platen embedded within or disposed adjacent to the stationary mold part 62. As another alternative, the retaining assembly 22 may use pins or other structures for holding the fabric 14 rather than compression. For example, the head 50 may include a plurality of pins (not shown) that extend through the interstices of the fabric (i.e. the open spaces between the intersecting strands of the fabric).

3. Molding Assembly.

Figure 5:
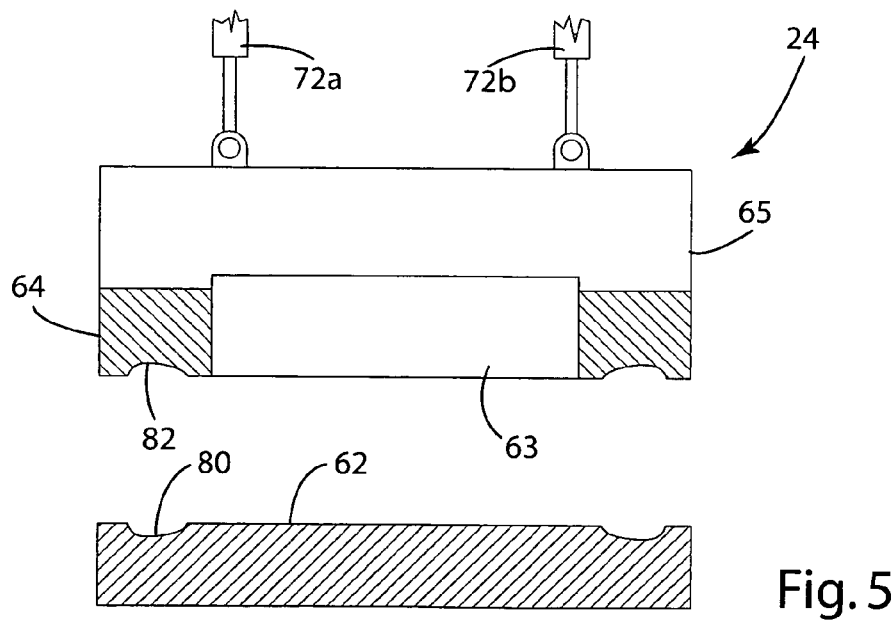
FIG. 5 is a partially sectional side view of the mold assembly.

The mold assembly 24 is configured to mold the frame 12 directly onto the periphery of the load bearing fabric 14 while the fabric 14 is held in the stretched condition by the fabric retaining assembly 22. Except as described herein, the mold assembly 24 is generally conventional. Referring now to FIG. 5, the mold assembly 24 generally includes a stationary mold part 62 and a moving mold part 64. The stationary mold part 62 is generally conventional and may be mounted to essentially any suitable support structure (not shown). The stationary mold part 62 defines contours 80 that correspond in shape to a portion of the frame 12.

The moving mold part 64 is mounted for reciprocating movement into and out of engagement with the stationary mold part 62. The moving mold part 64 defines contours 82 that correspond in shape to a portion of the frame 12. In the illustrated embodiment, the moving mold part 64 is mounted to a backing plate 65. The mold assembly 24 of the illustrated embodiment includes a pair of mold cylinders 72a-b for moving the moving mold part 64 into and out of engagement with the stationary mold part 62. The mold cylinders 72a-b may be replaced by other mechanisms capable of moving the moving mold part 64. Movement of the moving mold part 64 may be shepherded along conventional guide tubes (not shown), if desired.

As noted above, the moving mold part 64 defines a central void 63 configured to accommodate the head 50 of the fabric retaining assembly 22. The moving mold part 64 defines a pair of openings 67a-b (See FIG. 1) configured to permit the retaining cylinders 52a-b to freely extend through the backing plate 65 into engagement with the head 50. In the illustrated embodiment, the rods of the retaining cylinders 52a-b extend through the openings 67a-b and are operatively connected to the head 50.

In the illustrated embodiment, the contours 80 and 82 of the two mold parts 62 and 64 are configured to come together when the mold assembly 24 is closed. When closed, the contours 80 and 82 cooperatively define a mold cavity 66 corresponding with the desired shape of the frame 12 (See FIG. 6G).

Figure 7A:
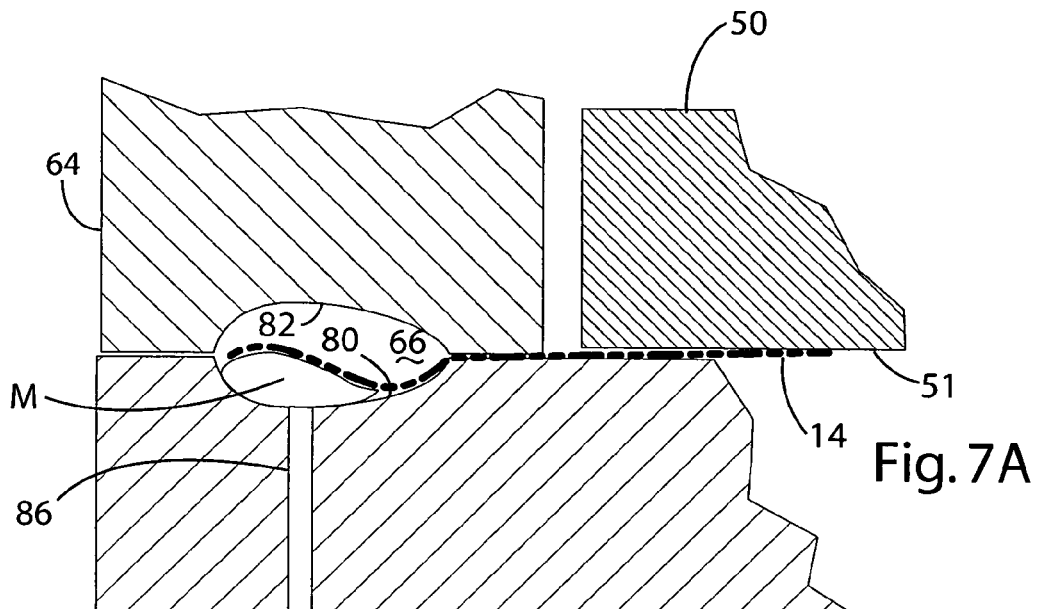
FIG. 7A is an enlarged sectional view of a portion of the mold assembly before molding.
Figure 7B:
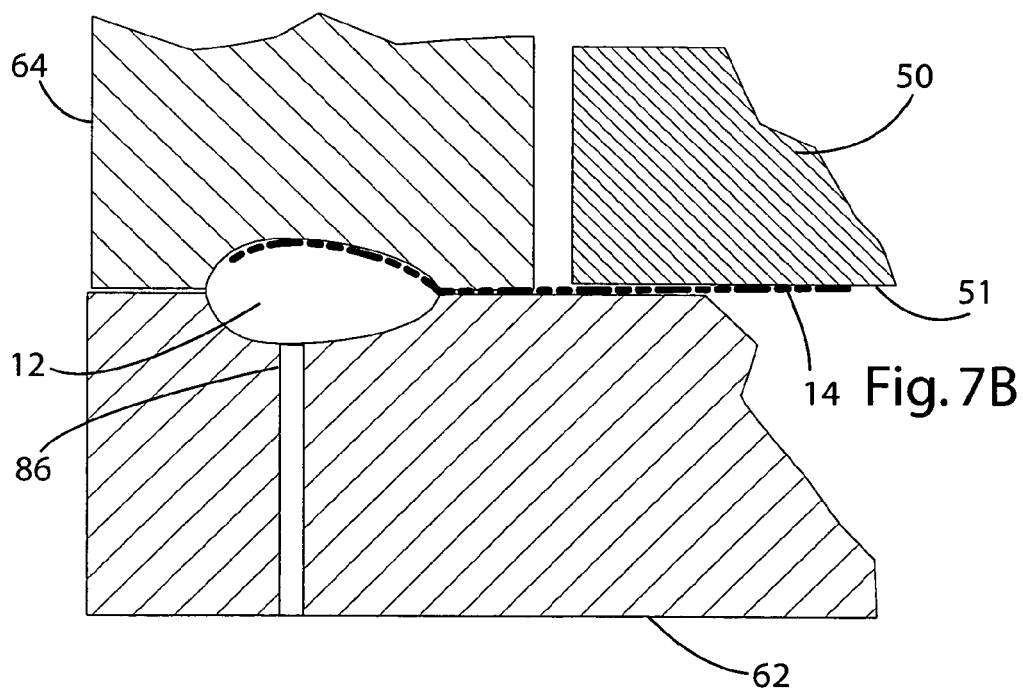
FIG. 7B is an enlarged sectional view of a portion of the mold assembly after molding.

The mold assembly 24 also includes a conventional material injection assembly (not shown) for injecting molten material into the mold cavity 66. As shown in FIGS. 7A and 7B, the gate 86 may be disposed in the stationary mold part 62, where it directs the flow of molten material upwardly into the mold cavity 66. The sprues, runners and gates may be configured to supply molten material to the mold cavity from only one side of the fabric (e.g. from the side of the mold that defines the visible surface of the frame 12). The flow of molten material into the mold cavity 66 on only one side of the fabric 14 will push the fabric 14 against the opposite side of the mold cavity 66. This method may be used to push the fabric 14 to a surface of the frame 12 that will not be visible (or will be less visible) during use of the load bearing fabric structure. Alternatively, the sprues, runners and gates may be configured to supply molten material to the mold cavity 66 on both sides of the fabric 14. Control over the supply of molten material to the mold cavity 66 may retain the fabric 14 near the center of the mold cavity 66, thereby preventing the fabric 14 from being pushed to a surface of the frame 12 where it might be visible.

4. Operation.

Operation of the manufacturing system 10 will now be described in connection with FIGS. 6A-6H. For purposes of disclosure, a single cycle of operation of the manufacturing system 10 will be described. The process may be repeated as desired to produce the desired number of load bearing fabric structures.

To prepare the system 10 for operation, the mold cylinders 72a-b are retracted to lift the moving mold part 62 away from the stationary mold part 64 and the retaining cylinders 52a-b are retracted to lift the head 50 away from the stationary mold part 64. Additionally, the stretching assembly is moved into the loading position by extending the stretch cylinders 46a-d to move the clamps 34a-d inwardly toward one another. The clamp cylinders 38a-d are retracted to open the clamps 34a-d (See FIG. 6A).

The load bearing fabric 14 is loaded into the stretching assembly 20, for example, by manually placing the load bearing fabric 14 so that its peripheral edge is located within the sweep of the clamp heads 36a-d. The fabric 14 may be essentially any form of load bearing fabric, including without limitation load bearing fabrics that incorporate elastomeric strands extending in at least one direction. The size and shape of the fabric 14 is selected so that the free edges of the stretched fabric 14 terminate in the mold cavity 66, as described in more detail below. In some applications, it may be desirable for one or more portions of the peripheral edge of the fabric 14 to terminate outside of the mold cavity 66. Although the fabric 14 is loaded manually in the illustrated embodiment, a variety of conventional automated loading systems may be used to load the fabric 14 onto the stretching assembly 20.

Figure 6A:
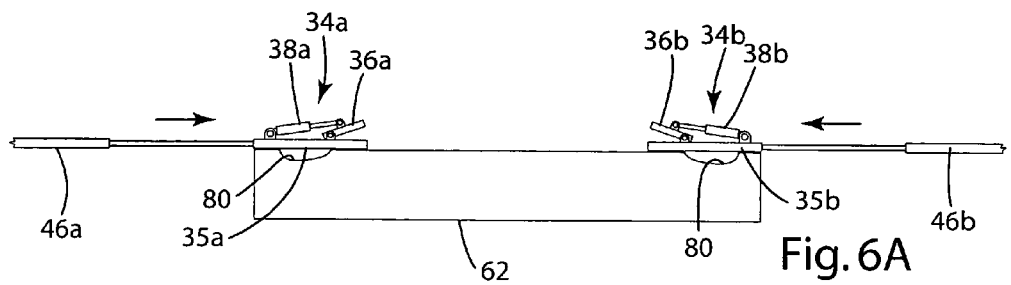
FIG. 6A is a side view of a portion of the manufacturing system prepared for loading.
Figure 6B:
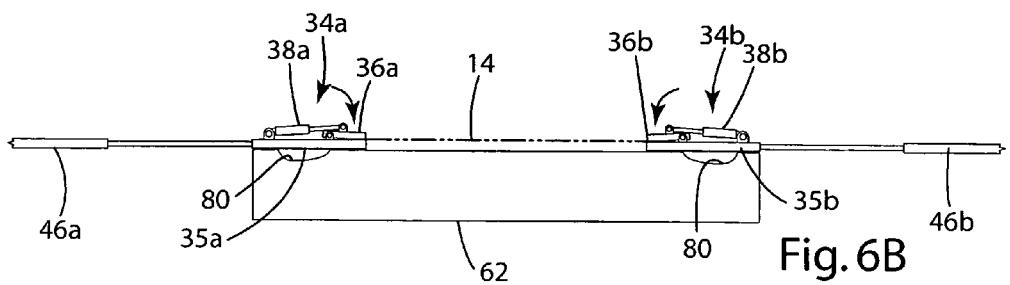
FIG. 6B is a side view of a portion of the manufacturing system with the fabric loaded.
Figure 6C:
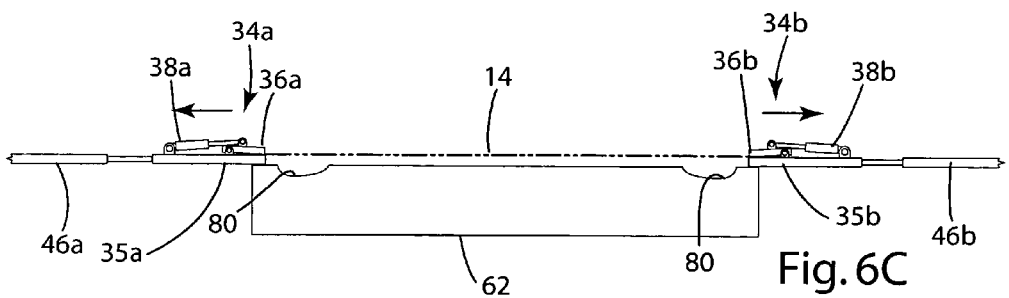
FIG. 6C is a side view of a portion of the manufacturing system with the fabric stretched.

After the load bearing fabric 14 has been loaded, the clamp cylinders 38a-d are extended, thereby causing the clamp heads 36a-d to close down onto the bases 35a-d (See FIG. 6B). In this way, the clamps 34a-d clamp onto the peripheral edge of the load bearing fabric 14. The clamps 34a-d are closed with sufficient force to maintain hold of the fabric 14 even while it is stretched.

After the clamps 34a-d are closed, the stretching assembly is moved into the stretching position. More specifically, the stretch cylinders 46a-d are retracted an appropriate amount to apply the desired stretch to the fabric 14 (See FIG. 6C). The amount of stretch applied to the fabric 14 is determined as a function of the tension desired in the finished product.

Figure 6D:
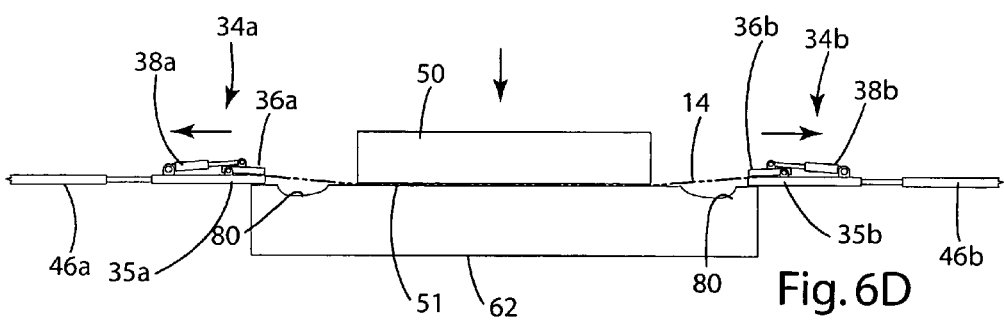
FIG. 6D is a side view of a portion of the manufacturing system with the head of the fabric retaining system in position on the stretched fabric.

The fabric retaining assembly 22 is then closed on the stretched fabric 14 (See FIG. 6D). The retaining cylinders 52a-b are extended to drive the head 50 into contact with the stretched fabric 14. As the retaining cylinders 52a-b are extended farther, the head 50 pushes the fabric 14 down into engagement with the surface of the stationary mold part 62. In this way, the fabric 14 is sandwiched between the head 50 and the stationary mold part 62. The retaining cylinders 52a-b are extended with sufficient force to retain the fabric 14 in the stretched condition even after the fabric 14 is released by the stretching assembly 20.

Figure 6E:
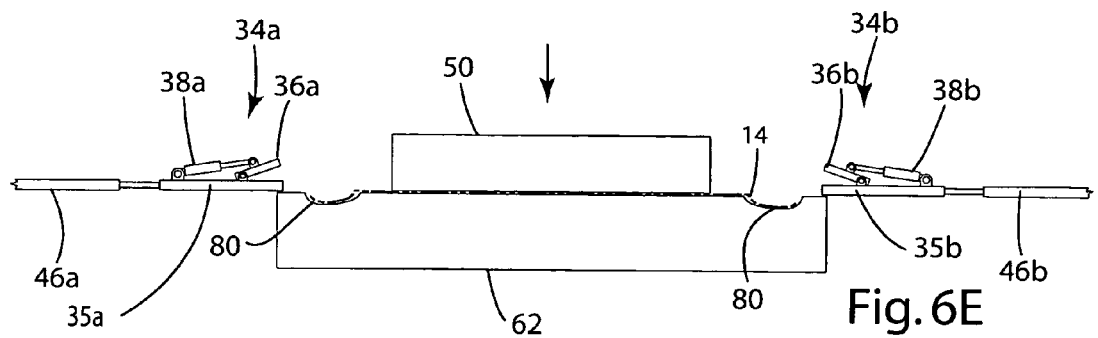
FIG. 6E is a side view of a portion of the manufacturing system with the fabric released from the stretching assembly.

Once the head 50 is extended and the fabric 14 is being securely held against the face of the stationary mold party 62, the clamp cylinders 38a-d are retracted to open the clamps 34a-d and release the edges of the fabric 14 (See FIG. 6E). The fabric 14 is sized and shaped so that the peripheral edge of the fabric 14 terminates within the mold cavity 66 once released by the clamps 34a-d.

Figure 6F:
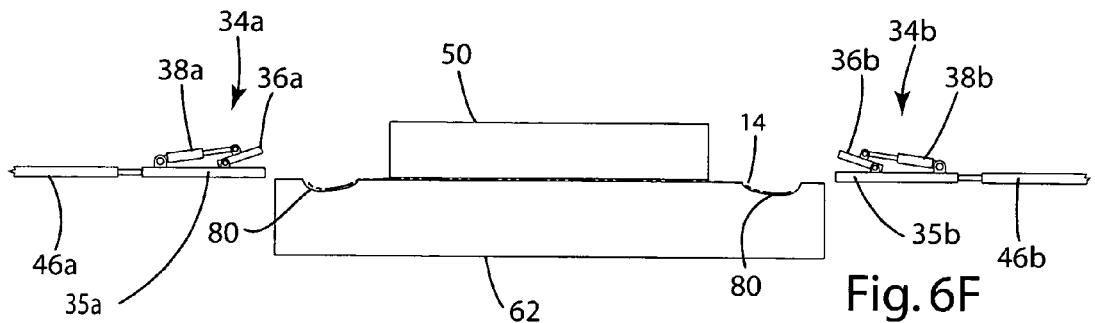
FIG. 6F is a side view of a portion of the manufacturing system with the stretching assembly retracted for molding.

The stretch assembly 20 is then moved into the retracted position shown in FIG. 6F. More specifically, the stretch cylinders 46a-d are retracted a sufficient amount to move the clamps 34a-d out of the path of the moving mold part 64.

Figure 6G:
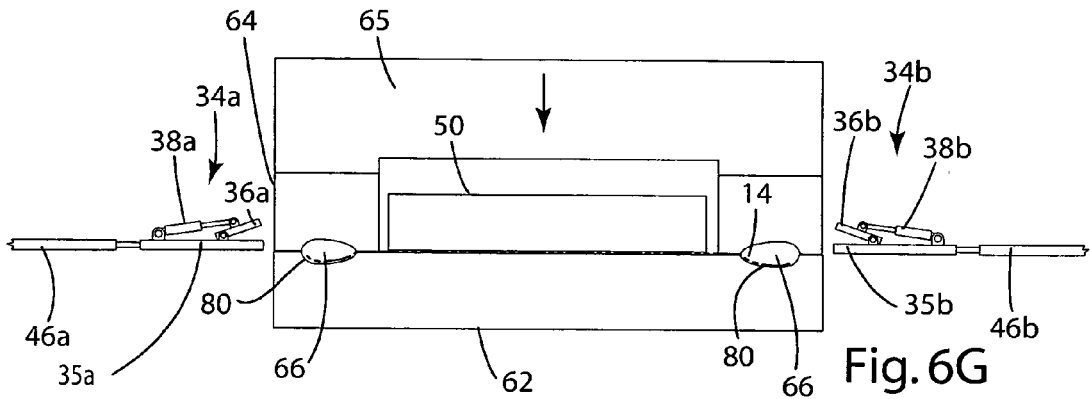
FIG. 6G is a side view of a portion of the manufacturing system with the mold closed.

After the clamps 34a-d have been moved out of the path of the moving mold part 64, the mold assembly 24 is moved into the molding position. As shown in FIG. 6G, the mold cylinders 72a-b are extended to move the moving mold part 64 into contact with the stationary mold part 64, which closes the mold assembly 24. Once closed, the contours 80 and 82 are aligned with one another to cooperatively define the mold cavity 66.

Figure 6H:
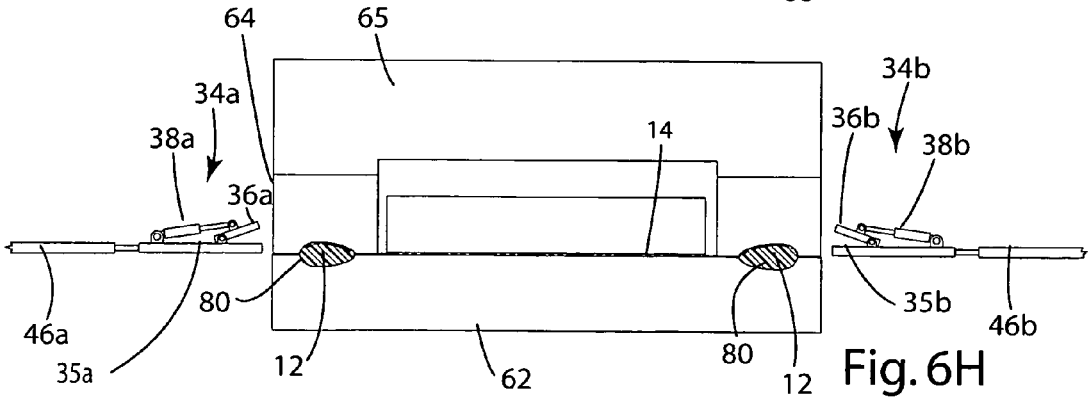
FIG. 6H is a side view of a portion of the manufacturing system after the frame is molded.

After the mold assembly 24 has been closed, molten material M is introduced into the mold cavity 66 to form the frame 12 (See FIG. 6H). As shown in FIG. 7A, the gate 86 extends upwardly into the mold cavity 66. With the gate 86 in this position, molten material M introduced into the mold cavity 66 pushes the fabric 14 up into engagement with the upper surface of the mold cavity 66. FIG. 7B shows the fabric 14 lining the upper surface of the mold cavity after the mold cavity 66 has been filled with molten material M.

The mold assembly 24 is given sufficient time for the molten material M to cure and then the mold assembly 24 is opened to release the frame 12. Because the peripheral edges of the load bearing fabric 14 terminated in the mold cavity 66, it is not necessary to trim any excess material from the molded product.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A method for manufacturing a load bearing fabric structure comprising the steps of:
   stretching a load bearing fabric with a stretching assembly;
   engaging the stretched load bearing fabric with a fabric retaining assembly after said stretching step, the stretching assembly being separate from the fabric retaining assembly;
   releasing the load bearing fabric from the stretching assembly after said engaging step wherein at least a portion of the fabric is retained in the stretched condition by the fabric retaining assembly;
   closing a mold about the load bearing fabric after said releasing step with at least a portion of the peripheral edge of the load bearing fabric disposed within a mold cavity while retaining at least a portion of the fabric in the stretched condition by the fabric retaining assembly, the mold being separate from the fabric retaining assembly wherein said engaging step occurs prior to said closing step;
   injecting molten material into the mold cavity after said closing step to form a frame directly onto the peripheral edge of the load bearing fabric; and
   selecting the size and shape of the fabric so that at least a portion of the peripheral edge of the fabric is disposed in the mold cavity during the injecting step.

2. The method of claim 1 wherein said stretching step is further defined as:
   holding the peripheral edge of the fabric with the stretching assembly; and
   expanding the stretching assembly to apply tension to the fabric.

3. The method of claim 1 wherein said stretching step is further defined as:
   closing a clamp onto the peripheral edge of the fabric; and
   moving the clamp to apply tension to the fabric.

4. The method of claim 1 wherein said stretching step is further defined as:
   closing a plurality of clamps on the peripheral edge of the fabric; and
   moving the clamps apart from one another to apply tension to the fabric.

5. The method of claim 1 wherein said engaging step is further defined as moving a head into engagement with the stretched fabric.

6. The method of claim 1 wherein said engaging step is further defined as moving a head into engagement with the stretched fabric and into engagement with the mold, whereby the fabric is sandwiched between the head and the mold.

7. The method of claim 1 further including the step of selecting the size and shape of the fabric so that the entire peripheral edge of the fabric is disposed in the mold cavity after said closing step.

8. The method of claim 1 wherein the injecting step includes aiming the molten material to direct the peripheral edge of the fabric away from a visible surface of the frame.

9. A method of manufacturing a load bearing fabric structure, comprising the steps of:
   providing a mold having two mold parts configured to cooperatively define a mold cavity;
   engaging the peripheral edge of a load bearing fabric with a stretching assembly;

stretching the load bearing fabric with the stretching assembly;

engaging a portion of the stretched fabric inwardly from the peripheral edge with a retaining assembly after said stretching step, the stretching assembly being separate from the retaining assembly;

releasing the load bearing fabric from the stretching assembly after said engaging step while continuing to engage a portion of the load bearing fabric with the retaining assembly, whereby at least a portion of the load bearing fabric is retained in the stretched condition;

closing the mold onto the load bearing fabric after said releasing step with at least a portion of the peripheral edge of the load bearing fabric disposed within the mold cavity while continuing to engage a portion of the load bearing fabric with the retaining assembly, the retaining assembly being separate from the mold wherein said engaging step occurs prior to said closing step;

selecting the size and shape of the fabric so that at least a portion of the peripheral edge of the fabric is disposed in the mold cavity after the peripheral edge of the fabric is released from the stretching assembly;

injecting molten material into the mold cavity after the closing step; and curing the molten material to form a structural component directly onto the peripheral edge of the load bearing fabric.

10. The method of claim 9 wherein said first engaging step includes closing a plurality of clamps onto the peripheral edge of the load bearing fabric.

11. The method of claim 10 wherein said stretching step includes moving the plurality of clamps to apply a desired stretch to the load bearing fabric.

12. The method of claim 11 wherein said second engaging step includes sandwiching the load bearing fabric between the retaining assembly and a mold part.

13. The method of claim 12 wherein said releasing step includes opening the plurality of clamps to release the peripheral edge of the load bearing fabric.

14. The method of claim 13 wherein the load bearing fabric is sized and shaped so that the entire periphery of the load bearing fabric is disposed in the mold cavity during said injecting step.

15. The method of claim 9 wherein the injecting step includes aiming the molten material to direct the peripheral edge of the fabric away from a visible surface of the structural component.

* * * * *

UNITED STATES PATENT AND TRADEMARK OFFICE
CERTIFICATE OF CORRECTION

| | | |
|---|---|---|
| PATENT NO. | : 7,618,572 B2 | Page 1 of 1 |
| APPLICATION NO. | : 11/432254 | |
| DATED | : November 17, 2009 | |
| INVENTOR(S) | : Timothy P. Coffield | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Twenty-sixth Day of October, 2010

David J. Kappos
*Director of the United States Patent and Trademark Office*